Sept. 22, 1964  A. F. ENEMARK  3,149,778
COMPRESSOR PARTICULARLY HERMETICALLY SEALED
MOTOR-COMPRESSOR FOR REFRIGERATING UNITS
Filed Jan. 25, 1961

United States Patent Office 3,149,778
Patented Sept. 22, 1964

3,149,778
COMPRESSOR PARTICULARLY HERMETICALLY SEALED MOTOR-COMPRESSOR FOR REFRIGERATING UNITS
Arne Fromm Enemark, Sonderborg, Denmark, assignor to Danfoss ved ingenior Mads Clausen, Nordborg, Als, Denmark, a Danish firm
Filed Jan. 25, 1961, Ser. No. 84,810
Claims priority, application Denmark, Jan. 25, 1960, 281/60
9 Claims. (Cl. 230—172)

The present invention relates generally to reciprocating compressors and more particularly a hermetically sealed motor-compressor for refrigerating units with a one piece crankshaft supported in a bearing which is located on each side of the crank-pin in the crank-case.

The use of a two bearing piece crankshaft normally calls for a divided crank-case and requires each of the divided parts to have one of the main bearings or said main bearing to have detachable sleeves which are also divided in two parts. That means that the crank-case can first be assembled only after the crankshaft is located on the right spot. One disadvantage hereby is, that a lot of the parts which are made in advance will have to be exactly adjusted when they are assembled and alignment is difficult.

Due to that reason hermetically sealed motor-compressors for refrigeration units have been manufactured with only one long bearing for the crank-pin or crankshaft. By that means it is unnecessary to divide the bearing in two parts, but the uneven or poor distribution of pressure is to be left as it is, and the rotor of the electric motor can first be mounted on that part of the crankshaft which is located on the opposite side of the bearing of the eccentric only when the crankshaft is mounted. Another factor of that construction is, that the cylinder and the bearing can not be built as a unit. These disadvantages will according to the invention be solved in a simple way, if the two main bearings for the crankshaft are undivided and formed in one piece together with the cylinder-block, and if the crankshaft for mounting from the outside throughout the first main bearing is supplied with a spacing member which is located between the bearing-pin and the crank-pin with said spacing member having a length greater or equal to the first main bearing, and with a cross-section to be within the projection of the cross-section of the crank-pin upon the cross-section bearing-pin. The cross-section of the crank-pins is less or equal to the cross-section of the first fixed bearing. By this construction it is possible to mount the crank-shaft from the outside into the main bearings which are in one unit with the cylinder.

When one of the spacing members is in the first main bearing, the crankshaft can be pushed in a radial direction, and it is possible to push the crank-pin and the other spacing member throughout the main bearing into its final position. There is thus the possibility to give that part of the crankshaft which is located outside the first main bearing an unlimited cross-section for mounting the rotor of the electrical motor directly on the driving end of the crankshaft. Another advantage of the invention is that the number of manufactured parts is less than usual due to the fact that the main bearings can be bored on a production line, and all motors in one series will have the same fit, without being dependent upon the divided bearing adjustment. Other constructional features according to the invention can include a movable bearing on the crankshaft, which connects the crank-pin and the reciprocating piston-pin, in the form of an undivided bearing if the bore diameter of said bearing is at a maximum equal to the first main bearing diameter and at a minimum equal to the second main bearing diameter.

The spacing member between the crank-pin and second bearing-pin and second bearing-pin has an actual length larger then that of the movable bearing.

The insertion of the second bearing-pin and the crankshaft in the movable bearing is in principal equal to the insertion throughout the first main bearing. This simple mounting means makes it possible to assemble the piston, cylinder and bearing in a unit without further consideration e.g. divided bearings etc.

According to the invention, the connection between the reciprocating piston and the movable bearing can be made with a connection rod. As known, it is necessary with a connection rod to maintain a certain angle between the center-line of the cylinder and the center-line of the crankshaft. This angle can very simply be obtained when the corresponding borings are formed only in a single housing rather than in a divided housing, where the angle first can be adjusted after the assembly. In many cases it can be of great advantage if the movable bearing is formed as a Scotch yoke. This construction is advantageous for avoiding angle differences which can occur under operation due to temperature stress or the like. Since it is impossible to form a divided Scotch yoke, this construction according to the invention makes it possible for the first time to utilize this device with a two bearings-shaft with undivided bearings, and an undivided crankshaft. The insertion is secured by choosing the distance between the bearing ends of the first-second bearings facing each other larger than the actual length of the first spacing member and the crank-pin. An increase of the cross-section of the spacing member is the full projection of the crank-pin cross-section on the bearing-pin cross-section i.e. limited to the area within the intersection of the arc of two circles.

This construction has one additional advantage, that the crankshaft under fabrication needs to be lined up in the lathe only two times, one time in the bearing pin center-line and one time in crank-pin center-line. According to the invention, the supporting member for the electromotor, the first main bearing, the second bearing, and the cylinder are made as a one piece unit, and hereby is obtained a motor-compressor consisting of less parts than usual with said parts being cheap and easy to produce. This complete unit could be e.g. be formed of a material such as cast iron or like common material.

Further objects, features and advantages of the present invention will be apparent from the following detailed description thereof and from the accompanying drawings, in which FIG. 1 is a longitudinal section of a compressor embodying the invention;

Figure 1:
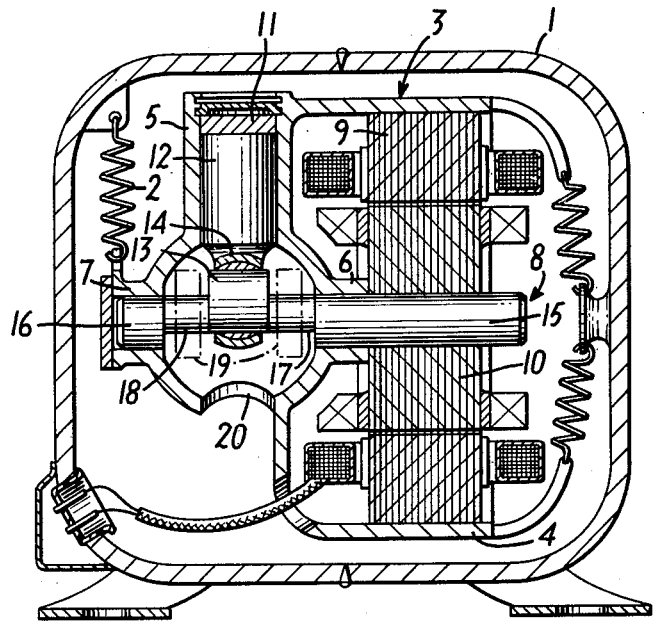

The motor-compressor in FIG. 1 is suspended in the shell 1, by means of the springs 2, the bearing-housing or supporting member 4, compressor cylinder 5 with the first main bearing 6 and the second bearing 7 for the motor crankshaft 8, the stator 9 and the rotor are of the conventional type. The cylinder top is covered by the valve plate 11 here shown schematically only. The piston 12 is connected with the crank-pin 13 and the crankshaft 8 by means of the Scotch yoke.

The crankshaft 8 rests with the bearing-pin 15 in the first main bearing 6 and the other bearing-pin 16 rests in the second main-bearing 7. Between the crank-pin 13 and the bearing-pin 15 is a spacing member or portion 17, and between the crank-pin 13 and the bearing-pin 16 is another spacing member or portion 18. The two spacing members 17 and 18 can if desired be supplied with counter balances as shown with dotted lines.

Figure 2:
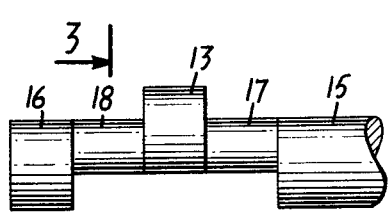
FIG. 2 is a fragmentary view of a crankshaft according to the invention.
Figures 3, 4:
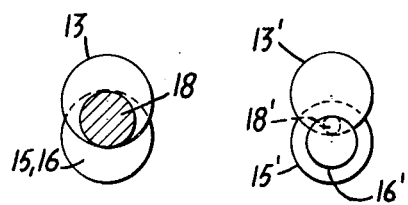
FIG. 3 is a cross-section along the line 3—3 of the crankshaft in FIG. 2.
FIG. 4 is a cross-section of another crankshaft according to the invention.
Figure 5A:
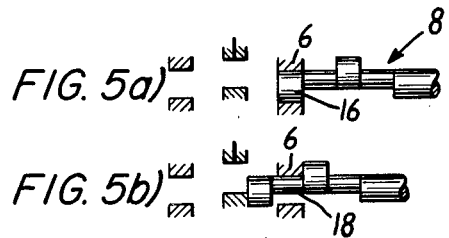
FIG. 5 shows schematically from a to e the mounting means for the crankshaft in the two main bearings and the movable bearing.
Figure 5B:
Figure 5C:
Figure 5D:
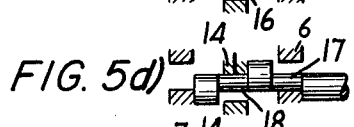
Figure 5E:
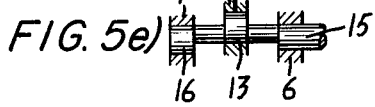

The piston 12 can before the mounting of the crank-pin be pushed from below in the cylinder 5 through the slot 20 in the housing 3. FIGS. 2 and 3 show the crankshaft according to the invention looking from the end and in cross-section along the line 3—3.

The example in FIG. 4 differs from FIGS. 2 and 3 (note the numbers marked here with an apostrophe), with the crank-pin 13' having a larger diameter than the bearing-pin 16', and the bearing-pin 15' having a still larger diameter than the crank-pin 13' and with the center-line of the crank-pin and the bearing-pin center-line being spaced from each other, in order to give a greater stroke. It is also seen that the cross-section of the spacing member is limited to the area of the intersection of the arcs of the two circles. Mounting of the crankshaft in the bearings without any difficulty is shown in FIG. 5. The following calculation will have to be taken into consideration. The cross-section of the crankshaft from the bearing-pin 16, to the bearing-pin 15 may not at any spot be bigger than the bore diameter of the main bearing 6. According to FIG. 3 all the pins 13, 15 and 16 have the same diameter which corresponds to the diameter of the first main bearing 6. In this particular example it is possible to obtain the biggest possible stroke without overestimation of the main bearing and bearing-pins.

The optimum solution is when the diameter of 13, 15 and 16 is equal and give the smallest overall length. The only limit in this case is due to the mechanical rigidness of the spacing members. Decreasing diameter of the pins 15, 13 and 16 in the mentioned sequence is shown in FIG. 4. In the same manner may the cross-section be chosen for those parts which pass throughout the bearing 7, as the end views in FIG. 3 and FIG. 4 show, in which the cross-section of the spacing members (18—18') is less or equal to the overlapping area produced by the projection of the cross-section of the crank-pin upon the cross-section of the bearing-pin.

Furthermore, the spacing member 17 has a larger axial length than the first main bearing 6 and the spacing member 18 has a larger axial length than the movable bearing 14, and the axial length of the bearing 6. The distance between the first and second bearing ends facing each other, is larger than the actual length of the first spacing member and the crankshaft. According to FIG. 5 the first main bearing 6, the second main bearing 7 and the movable bearing 14 are only shown schematically. The crank-pin 8 passes from the outside throughout the first main bearing 6. The following (see the schematical sketches from a to e) shows the assembly of the device.

First (a) the bearing-pin passes the main bearing 6, then (b) as the operation continues the crankshaft is pushed until the spacing member 18 is located in bearing 6. The crankshaft will have to be dropped down to the bottom part of the bearing 6 and if the movable bearing 14 is located in the right position, (c), the crank-pin 13 can be pushed in the main bearing 6 and the bearing-pin 16 in the movable bearing 14.

Then (d), the crankshaft is pushed further to the left and the spacing members or portions 17 and 18 will respectively be located in the main bearing 6 and in the movable bearing 14. In this position the crank-pin can be lifted and this requires that the movable bearing 14 be lifted a corresponding distance and a final movement to the left results in (e), with the crankshaft in its final position.

The bearing-pin 16 will now be located in the second bearing 7, the crank-pin 13 will be located in the movable bearing 14 and the bearing-pin 15 will be in first main bearing 6.

The counter balance 19 on the spacing portions 17 and 18 can be placed while the crankshaft is being mounted, or may be fixed by means of bolts or screws. This machine is characterized by a low producing-cost, quiet running and simple production of the different parts.

What I claim and desire to secure by Letters Patent is:

1. Reciprocating compressor consisting of a cylinder and a reciprocating piston actuated by a one-piece crankshaft, said cylinder being formed in a one-piece integral casing unit and said unit being formed with axially spaced-apart bores defining fixed and unadjustable bearings and comprising a first bearing bore and a second bearing bore, said one-piece crankshaft consisting of a plurality of cylindrical parts including a motor shaft, a first cylindrical bearing pin, a cylindrical crankpin, a second cylindrical bearing pin, said crankpin being angularly displaced from said bearing pins said first and second bearing pins and said crankpin being in fixed relation to each other by spacing portions, said spacing portions having a length at least equal to the length of said first bearing bore, the cross section of said spacing portions being within the projection of said crankpin cross section on the cross section of the first bearing and the cross section of said crankpin being at most equal to the cross section of said first bearing bore, and said bearing pins having an external diameter substantially equal to the internal diameter of said bearing bores, whereby said bearing pins are receivable in said bores with a close sliding and rotating fit.

2. Reciprocating compressor consisting of a cylinder and a reciprocating piston actuated by a one-piece crankshaft, said cylinder being formed in a one-piece integral casing unit and said unit being formed with axially spaced-apart bores defining fixed and unadjustable bearings and comprising a first bearing bore and a second bearing bore, said one-piece crankshaft consisting of a plurality of cylindrical parts including a motor shaft, a cylindrical bearing pin, a cylindrical crankpin, a second cylindrical bearing pin, said crankpin being angularly displaced from said bearing pins, said first and second bearing pins and said crankpin being fixed in relation to each other by spacing portions, said portions having a length at least equal to the length of said first bearing bore, the cross section of said spacing portions being within the projection of said crankpin cross section on the cross section of the said first bearing bore, and the cross section of said crankpin being at most equal to the cross section of first bearing bore, a movable bearing on the crankpin which connects the crankpin and the reciprocating piston, said movable bearing being an undivided bearing, the bore diameter of said movable bearing being at the maximum equal to the said first bearing bore and at the minimum equal to said second bearing bore diameter, and said bearing pins having an external diameter substantially equal to the internal diameter of said bearing bores, whereby said bearing pins are receivable in said bores with a close sliding and rotating fit.

3. Reciprocating compressor consisting of a cylinder and a reciprocating piston actuated by a one-piece crankshaft, said cylinder being formed in a one-piece unit and said unit being formed with axially spaced-apart bores defining fixed and unadjustable bearings and comprising a first bearing bore and a second bearing bore, said one-piece crankshaft consisting of a plurality of cylindrical parts including a motorshaft, a cylindrical bearing pin, a cylindrical crankpin, a second cylindrical bearing pin, said crankpin being angularly displaced from said bearing pins said first and second bearing pins and said crankpin being in fixed relation to each other by spacing portions, said portions having a length at least equal to the length of said first bearing bore, the cross section of said spacing portions being within the projection of said crankpin cross section on the cross section of the first bearing bore and the cross section of said crankpin being at most equal to the cross section of first bearing bore, a movable bearing on the crankpin which connects the crankpin and the reciprocating piston, said movable bearing being an undivided bearing, the bore diameter of said movable bearing being at the maximum equal to said first bearing bore and at the minimum equal to said second bearing bore diameter, and the spacing member between said crankpin and said second bearing pin having a length larger than said movable bearing, and said bearing pins having an external diameter substantially equal to the internal diameter of said bearing bores, whereby said bearing pins are receivable in said bores with a close sliding and rotating fit.

4. Reciprocating compressor consisting of a cylinder and a reciprocating piston actuated by a one-piece crankshaft, said cylinder being formed in a one-piece unit and said unit being formed with axially spaced-apart bores defining fixed and unadjustable bearings and comprising a first bearing bore and a second bearing bore, said one-piece crankshaft consisting of a plurality of cylindrical parts including a motorshaft, a cylindrical bearing pin, a cylindrical crankpin, a second cylindrical bearing pin, said crankpin being angularly displaced from said bearing pins said first and second bearing pins and said crankpin being in fixed relation to each other by spacing portions, said portions having a length at least equal to the length of said first bearing bore, the cross section of said spacing portions being within the projection of said crankpin cross section on the cross section of the first bearing bore, and the cross section of said crankpin being at most equal to the cross section of first bearing bore, a movable bearing on the crankpin which connects the crankpin and the reciprocating piston, said movable bearing being an undivided bearing, the bore diameter of said movable bearing being at the maximum equal to said first bearing bore and at the minimum equal to said second bearing bore diameter, the spacing portion between said crankpin and said bearing pin having a length larger than said movable bearing, the spacing member between said crankpin and said second bearing pin having a length larger than said movable bearing, and said reciprocating piston and the crankpin being connected by a connecting-rod, the lower end of said connecting-rod being provided with said movable bearing, and said bearing pins having an external diameter substantially equal to the internal diameter of said bearing bores, whereby said bearing pins are receivable in said bores with a close sliding and rotating fit.

5. Reciprocating compressor consisting of a cylinder and a reciprocating piston actuated by a one-piece crankshaft, said cylinder being formed in a one-piece unit and said unit being formed with axially spaced-apart bores defining fixed and unadjustable bearings and comprising a first bearing bore and a second bearing bore, said one-piece crankshaft consisting of a plurality of cylindrical parts including a motorshaft, a cylindrical bearing pin, a cylindrical crankpin, a second cylindrical bearing pin, said crankpin being angularly displaced from said bearing pins said first and second bearing pins and said crankpin being in fixed relation to each other by spacing portions, said portions having a length at least equal to the length of said first bearing bore, the cross section of said spacing portions being within the projection of said crankpin cross section on the cross section of the first bearing bore, and the cross section of said crankpin being at most equal to the cross section of first bearing bore, a movable bearing on the crankpin which connects the crankpin and the reciprocating piston, said movable bearing being an undivided bearing, the bore diameter of said movable bearing being at the maximum equal to said first bearing bore and at the minimum equal to said second bearing bore diameter, the spacing portion between said crankpin and said second bearing pin having a length larger than said movable bearing, and the connecting member for said reciprocating piston and said crankpin being a Scotch yoke, and said bearing pins having an external diameter substantially equal to the internal diameter of said bearing bores, whereby said bearing pins are receivable in said bores with a close sliding and rotating fit.

6. A reciprocating compressor as defined in claim 1, wherein the distance between the bearing ends of said first and second bearing facing each other is larger than the length of the first spacing member and the crankpin.

7. A reciprocating compressor as defined in claim 6, wherein the cross section of said spacing member has the total projection area of the crankpin cross section on said cross section of the bearing pin and said area is limited by the intersection of the arc of two circles.

8. A reciprocating compressor as defined in claim 7, wherein said spacing members are provided with counter balance means.

9. A reciprocating compressor as defined in claim 8, having a motor with a stator and wherein said first bearing is provided with a supporting member for the stator of the electric motor, and said first bearing, said cylinder, and said second bearing are a one-piece unit with the supporting member.

References Cited in the file of this patent

UNITED STATES PATENTS

| | | |
|---|---|---|
| 491,487 | Longenecker | Feb. 7, 1893 |
| 1,991,460 | Herzmark | Feb. 19, 1935 |
| 2,059,758 | Stearns | Nov. 3, 1936 |
| 2,218,928 | Towler et al. | Oct. 22, 1940 |
| 2,517,367 | Winkler | Aug. 1, 1950 |
| 2,796,760 | Gratzmuller | June 25, 1957 |
| 2,995,292 | Fleming | Aug. 8, 1961 |